2,971,982
METHOD OF MAKING 9-FLUORENONE

John O. Hawthorne, Pittsburgh, and Edward L. Mihelic, Sr., Wilkinsburg, Pa., assignors to United States Steel Corporation, a corporation of New Jersey No Drawing. Filed Mar. 5, 1959, Ser. No. 797,337

3 Claims. (Cl. 260—590)

This invention relates to the production of 9-fluorenone, a compound having various uses, some of which are mentioned hereinafter.

9-fluorenone may be produced by numerous reactions but all those known prior to our invention require a starting material which is expensive or is not available in commercial quantities. It is therefore the object of our invention to provide a method of making 9-fluorenone from a source material which is plentiful and of low cost.

Generally speaking, the method of our invention comprises the pyrolysis of 2-formyl-2'-biphenylcarboxylic acid at a temperature between 300 and 400° C. in an inert liquid medium such as mineral oil (e.g., petroleum distillate boiling from 330 to 390° C., sp. gr. 0.84 to 0.94). This acid is available in high yield from the ozonolysis of phenanthrene.

A complete understanding of the invention may be obtained from the following detailed explanation of the preferred practice.

In a 300-ml. round-bottom flask fitted with a reflux condenser, 4.0 g. of 2-formyl-2'-biphenylcarboxylic acid in 200 ml. of clear mineral oil was heated at 350 to 360° C. for 6½ hours. After cooling, the reaction mixture was extracted with six 100-ml. portions of glacial acetic acid. Two immiscible phases resulted. The fluorenone was extracted by the acetic acid and the tarry material was retained in the oil phase. The combined acetic-acid fractions were concentrated by evaporation to 100 ml. and then treated with decolorizing charcoal. Sodium-bisulfite solution (500 ml., 10%) was then added to the acetic-acid solution containing the fluorenone, and formed a soluble addition complex with the fluorenone. A small amount of precipitated material was removed by filtration, and the filtrate was treated with 70 ml. of concentrated sulfuric acid to regenerate the fluorenone from the addition complex. The fluorenone was then extracted from this aqueous medium with three 100-ml. portions of chloroform. After the chloroform solution was washed with 300 ml. of 10% aqueous sodium carbonate and two 100-ml. water washes, the fluorenone was recovered in 44% yield by stripping off the chloroform.

The reaction temperature appears to be important and should be between 300 and 400° C. Decreasing the amount of mineral-oil solvent tends to cause more tarry material to form. Increasing the amount of oil has the opposite effect, but longer reaction times are required.

The amount of oil (e.g., McKesson & Robbins white mineral oil) may vary between 40 and 75 ml. per gram of acid but is preferably about 55 ml./g. The temperature at which the pyrolysis is carried out may be between 340 and 370° C. The reaction time may vary between 4 and 8 hours. At least 6 hours will usually be necessary for a good yield.

9-fluorenone has been reported to have anticonvulsant activity. Useful herbicides consisting of 9-fluorenone or alkylfluorenones in an oil-in-water emulsion are the subjects of Patent No. 2,653,864. Fluorenone is the parent compound to fluorenone azines, which are useful as light-stabilizers for copolymers containing 95% or less polyvinylidene chloride (Patent No. 2,691,642). Fluorenone is also the parent compound in the formation of 9-oxa-9,10-dihydrophenanthrene-10-one, a product having light-stabilizing and rodent-repellent properties (Hawthorne et al. application Serial No. 700,545, filed December 4, 1957, now Patent No. 2,905,570).

It will be evident that the invention provides a simple method of making 9-fluorenone from a low-cost material which is readily obtainable. The starting material is available in high yield from the ozonolysis of phenanthrene. Since the method involves thermal decomposition, there is no need for other reactants. Thus, through a comparatively inexpensive process, 9-fluorenone may be readily made in commercial quantities.

Although we have disclosed the preferred embodiment of our invention, we intend to cover as well any change or modification therein which may be made without departing from the spirit and scope of the invention.

We claim:

1. A method of making 9-fluorenone which consists in heating 2-formyl-2'-biphenylcarboxylic acid to a temperature between 300 and 400° C. while suspended in an inert liquid medium.

2. A method of making 9-fluorenone which consists in forming a suspension of 2-formyl-2'-biphenylcarboxylic acid in mineral oil and heating it to a temperature above 300° C.

3. A method as described in claim 2, including the further step of extracting the reaction product from the oil.

References Cited in the file of this patent

Zal'kind et al.: Chem. Abstracts, vol. 31, pp. 4312–3 (1937).

Angelini: Chem. Abstracts, vol. 48, p. 12044 (1954).